United States Patent [19]

Graciotti

[11] Patent Number: 4,716,527
[45] Date of Patent: Dec. 29, 1987

[54] BUS CONVERTER

[75] Inventor: Alessandro Graciotti, Cupertino, Calif.

[73] Assignee: Ing. C. Olivetti, Italy

[21] Appl. No.: 679,704

[22] Filed: Dec. 10, 1984

[51] Int. Cl.[4] .......................................... G06F 13/00
[52] U.S. Cl. .................................................. 364/200
[58] Field of Search ... 364/200 MS File, 900 MS File; 370/67, 99

[56] References Cited

U.S. PATENT DOCUMENTS

| | | | |
|---|---|---|---|
| 3,638,195 | 1/1972 | Brender et al. | 364/200 |
| 3,976,979 | 8/1976 | Parkinson et al. | 364/200 |
| 4,214,302 | 7/1980 | Schmidt | 364/200 |
| 4,271,480 | 6/1981 | Vinot | 364/900 |
| 4,287,563 | 9/1981 | Huston, Jr. | 364/200 |
| 4,291,370 | 9/1981 | Charles | 364/200 |
| 4,309,754 | 1/1982 | Dinwiddie, Jr. | 364/200 |
| 4,347,567 | 8/1982 | De Tar, Jr. et al. | 364/200 |
| 4,390,967 | 6/1983 | Eglowstein et al. | 364/900 |
| 4,443,846 | 4/1984 | Adcock | 364/200 |
| 4,447,878 | 5/1984 | Kinnie et al. | 364/200 |

Primary Examiner—Gareth D. Shaw
Assistant Examiner—Jonathan C. Fairbanks
Attorney, Agent, or Firm—Darby & Darby

[57] ABSTRACT

A device for making a 16-bit data bus microprocessor compatible with peripherals, expansion devices and associated software designed for an 8-bit data bus. The 16-bit data bus is divided into high and low portions, the low portion of which is coupled to the 8-bit data bus by a buffer which is disabled or enabled. The high portion is selectively coupled to the 8-bit data bus when a high data byte is to be transferred either during 8-bit byte operation or in word operations. The device may be bypassed when 16-bit data bus expansion devices or peripherals are used.

11 Claims, 3 Drawing Figures

BUS CONVERTER

BACKGROUND OF THE INVENTION

1. Field of the Invention

The subject invention pertains to the field of computers and more particularly to a device for providing compatibility between a computer having a first, data bus structure and software and peripherals originally designed for use with a computer having a second different data bus structure.

2. Description of the Prior Art

A wide variety of microprocessor integrated circuits have been made by a variety of manufacturers in recent years. For various reasons, several of these microprocessor integrated circuits have become more widely used than others. Manufacturers, in order to provide the maximum compatibility between microprocessors of different generations have generally tried to retain the same or similar instruction set between various versions of their microprocessors.

One example of a microprocessor integrated circircuit in common use is the 8088 integrated circuit which is manufactured by the Intel Corporation, 3065 Bowers Avenue, Santa Clara, CA. 95051, and second sourced by others. The 8088 microprocessor integrated circuit is widely used in a variety of microcomputers and personal computers. It is, for example, used in a personal computer manufactured by International Business Machines Corp., Armonk, NY and known as the IBM PC.

The IBM PC has enjoyed a large degree of consumer acceptance and therefore a large software base has been written for it by third party software vendors. Also, a large variety of peripherals have been designed for it by third party manufacturers. In designing a new computer, many manufacturers have found it desirable to design a computer which can take full advantage of this software base and these peripherals while still incorporating advances provided by the technology available in microprocessors having the same instruction set that are faster and more powerful.

The Intel 8088 microprocessor integrated circuit, like many others, has an internal 16-bit data bus, but in order to decrease complexity, although at a concommitant loss of speed, only has 8 data lines brought external to the microprocessor. Thus, in order to provide 16-bits of data onto the internal 16-bit data bus, data must be taken serially in two successive 8-bit bytes. Since these bytes occur on successive clock pulses, there is an obvious loss of speed as compared to a microprocessor in which both bytes of a 16-bit data word are entered in parallel on one clock pulse.

An improved version of the 8088 microprocessor integrated circuit also manufactured by Intel Corporation, is the 8086 microprocessor integrated circuit. This uses the same instruction set as the 8088, but permits external access to its internal 16-bit data bus with a single 16-bit wide word. In other words, two 8-bit bytes are accessed in parallel. Additionally, both the 8086 and the 8088 can be run at a clock frequency of 5 Mhz or 8 Mhz. The above-mentioned IBM PC uses the lower frequency. Thus, it is clear that it is desirable to be able to utilize a microprocessor such as the 8086 at its maximum working clock frequency.

Heretofore, a manufacturer of a computer who wished to maintain compatibility with software and peripherals designed for the 8088 microprocessor and who also wished to obtain the greater speed available with the 8086 microprocessor, had to sacrifice a degree of compatibility with the software and peripherals available for use with the 8088 based computer. While the instruction set may have remained identical, the process in which data is moved throughout the computer's internal data bus architecture is different. Therefore, much software and most peripherals designed to work on an 8-bit data bus were adversely affected. The methods chosen to retain compatibility have been transparent to neither the software or the peripherals, or have only worked in limited cases.

Most peripherals, for example, a floppy disk controller, accept 8-bit wide data statements. This is not a problem with the 8-bit wide data bus of an integrated circuit such as the 8088. Much of the widely available software, however, writes information directly to the peripherals. Thus, such software cannot be used with a computer set up only for a 16-bit data bus using 16-bit peripherals.

A second problem arises as stated before, since the less powerful 8088 microprocessor reads instructions in successive bytes. Without some conversion, the external 16-bit data bus computer in, for example, 8086 based computers only reads from the bus to which the peripheral, such as the floppy disk controller, is connected and ignores the second or successive byte so that a portion of the 16-bit data bus, ordinarily the upper or odd portion, would receive all zeros in a write operation since there would be nothing connected to it. In a read operation, the 8086 would receive only half the information it expected.

Certain operations performed by the 8088 microprocessor require two successive bytes, while others require only a single byte. For example, the instruction MOV AX, [BX] requires two bytes to be moved between the microprocessor accumulator and the system memory addressed by BX.

In an integrated circuit such as the 8086, such a data transfer may be done in one 16-bit word operation. The data bus is arranged to have even bytes on one half of the word and odd bytes on the other. Both bytes are addressed simultaneously and in parallel.

It is also desirable to be able to utilize the full 16-bit wide capabilities of the 8086 microprocessor when it is used with devices, such as peripherals, memory expansion or other input/output devices that are designed to operate with a 16-bit wide data bus.

It is thus an object of the present invention to provide a device which permits the use of a microprocessor adapted for use with a data bus of a predetermined structure with software and peripherals designed for and compatible with a computer having a data bus of another predetermined, differing structure.

It is yet another object to provide a device which permits microprocessors adapted for use with a larger data bus to be compatible with software and peripherals having less speed and power.

It is still another object to permit a data processor adapted for use with an nm byte wide data bus to remain operable with devices designed for an nm byte wide data bus, while retaining compatibility with devices designed for an m byte wide data bus.

These and other objects of the invention will become more apparent upon reference to the following specification and the annexed drawings.

SUMMARY OF THE INVENTION

In accordance with an illustrative embodiment demonstrating objects and features of the present invention, there is provided a bus converter for making a data processing device designed for use with an nm byte wide data bus compatible with m byte wide devices external to the data processor, as well as retaining compatibility with nm byte wide devices. The bus converter transmits to and receives data signals from the data processor nm byte wide data bus, and divides this data bus into lower and higher portions. The data processor may have an instruction set having both m and nm byte wide operations. The bus converter detects whether the external device is an nm or m byte wide device. If it is nm byte wide the bus converter is bypassed. If it is an m byte wide device it is connected to the bus converter's output (m byte wide) data bus. If it is an m byte wide operation, it detects which byte portion should be coupled to the external device and selectively couples it. If an nm byte wide operation is called for, it sequentially couples the lower portion after the higher portion to the m byte wide external device.

DESCRIPTION OF THE PREFERRED EMBODIMENTS

Figure 1:
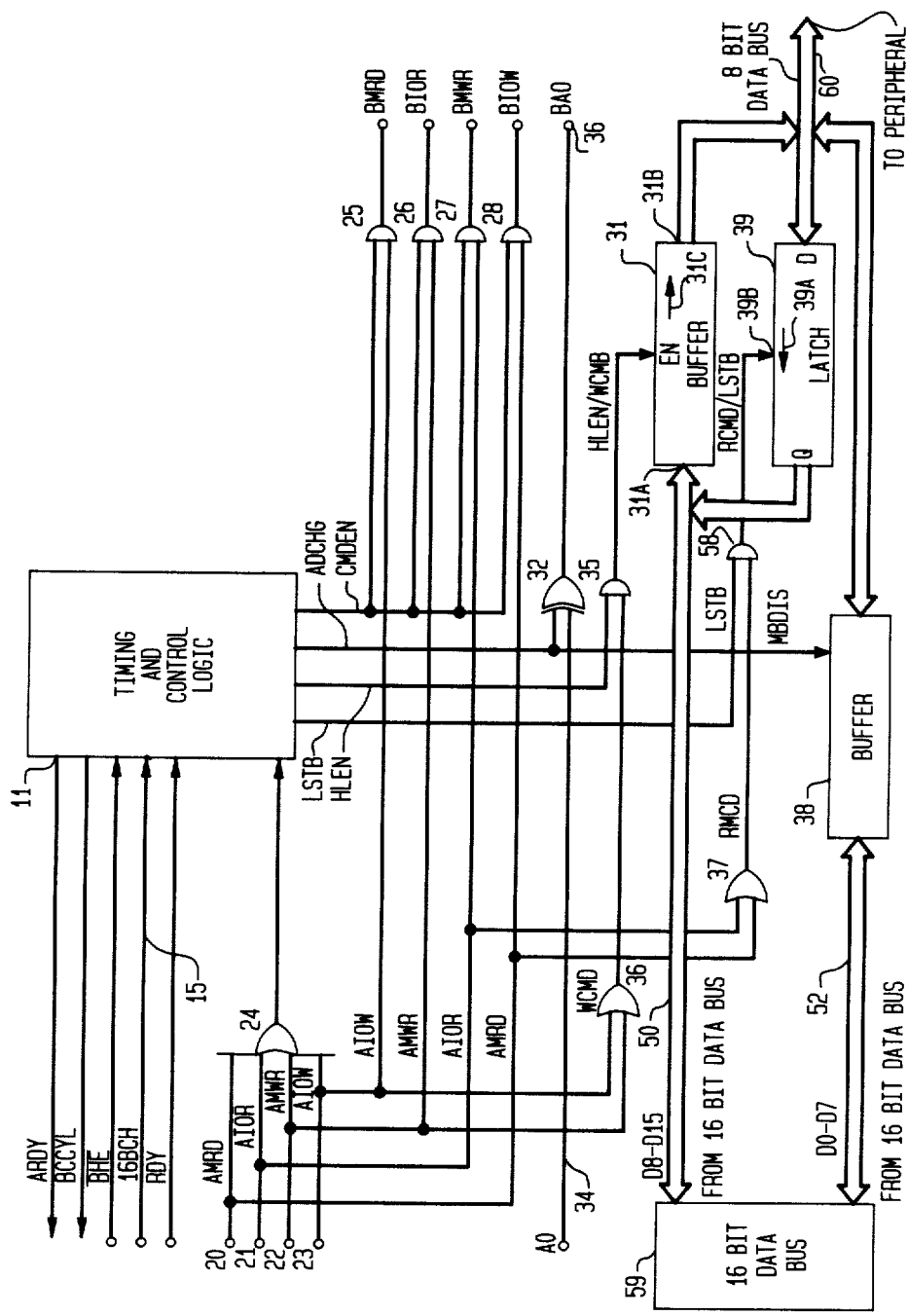
FIG. 1 is a block diagram of the bus converter according to the present invention.

Refer now to FIG. 1 in which a block diagram of a bus converter according to the present invention is shown. The bus converter permits 16-bit data transfers as well as 8-bit transfers to be used in an 8086 or other 16-bit microprocessor having a 16-bit wide data bus. When operated to accommodate 8-bit data transfers, the bus converter appears transparent to the software and/or peripherals. The bus converter permits the same machine to be compatible with older software and peripherals designed for use with an external 8-bit data bus as well as newer, improved software and peripherals which take full advantage of an external 16-bit data bus architecture. It should be emphasized that the data busses must be bidirectional to permit the flow of data both to and from the microprocessor.

In order to permit 16-bit data transfers, a signal designated as 16BCH is received on line 15 and coupled to the timing and control logic 11. The signal 16BCH determines whether an 8-bit bus or a 16-bit bus external device is present and is generated by a 16-bit bus device such as memory expansion circuitry, peripheral or other input/output devices. When a 16-bit transfer is to occur signalling that the peripheral or other device can communicate with 16-bit words, the 16BCH signal indicates this to control logic 11.

Figure 3:
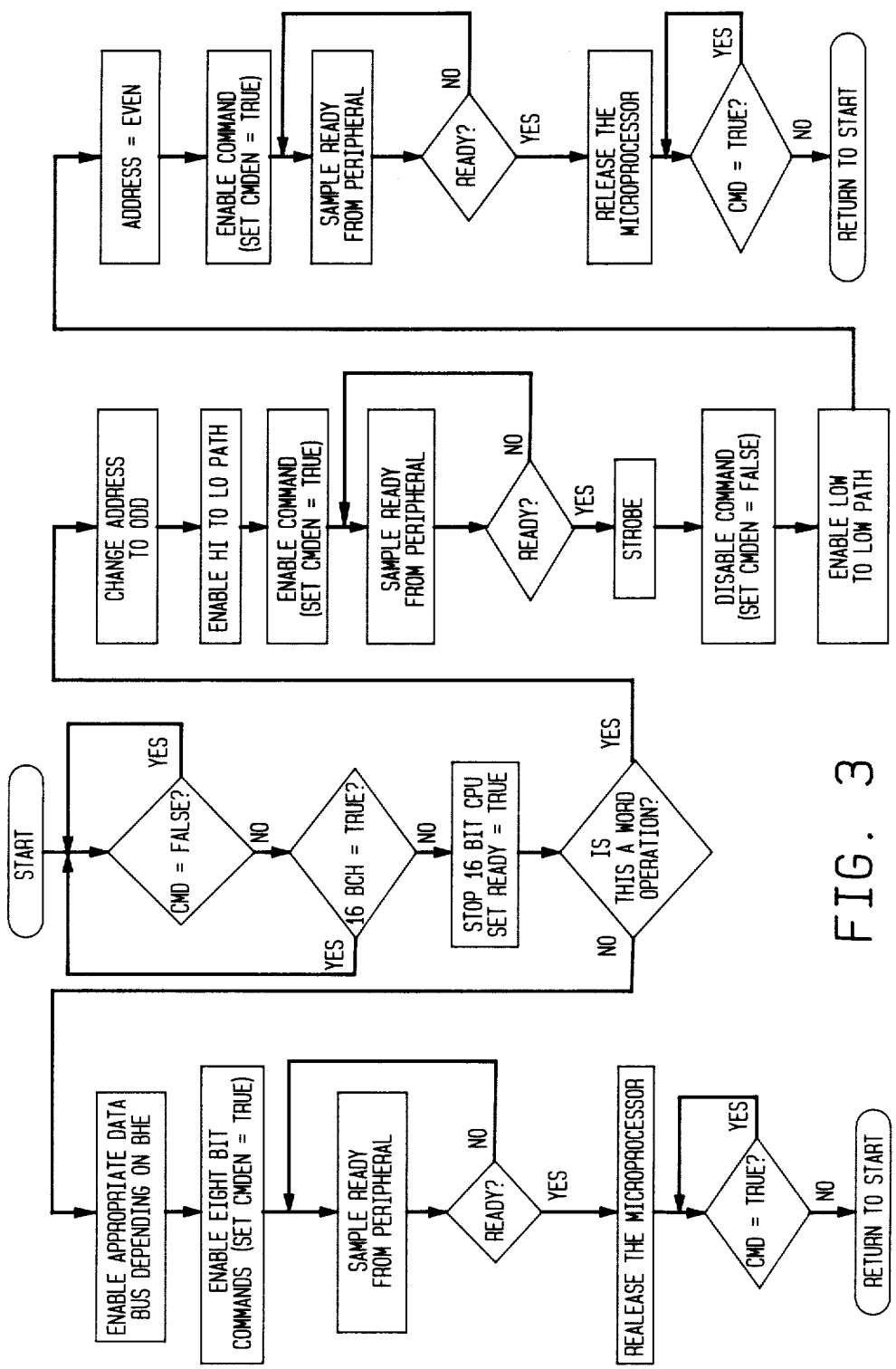
FIG. 3 is a flowchart explaining the operation of the present invention.

Refer now also to FIG. 3 which shows the operational flow of the present invention. Memory read (AMRD), memory write (AMWR), input/output read (AIOR) and input/output write (AIOW) are coupled to terminals 20, 21, 22 and 23, respectively and receive signals from the microprocessor or other data processor. These are logically orred in and gate 24 or equivalent to produce a data command (CMD) signal which is also applied to timing control logic 11 that signals the presence of any one of the data command AMRD, AMWR, AIOW or AIOR signals. Without the presence of at least one of these four signals, the bus converter will remain inactive, or in an idle state.

In FIG. 3, this is shown as the first decision in which it is determined whether or not a data command is present, that is, whether or not the CMD signal is active.

As shown in the flowchart of FIG. 3, if there is no command signal (CMD) present and/or if a 16BCH signal is present then the bus converter is in an idle state and does not do anything further. The bus converter is not needed to affect 16-bit data transfers, and is effectively bypassed, so that 16-bit data transfers occur via the 16-bit data bus 59. In practice, this may be accomplished by generating signals as follows.

AND gates 25, 26, 27, and 28 receive a command enable (CMDEN) signal from timing and control logic 11. These AND gates are also coupled in parallel to the input terminals 20, 21, 22 and 23. The command enable signal will change state to cause AND gates 25 through 28 to be disabled and thus disable the data commands to the 8-bit external device, namely, B memory read (BMRD), B memory write (BMWR), B input/output read (BIOR) and B input/output write (BIOW).

In a 16-bit data transfer, the data is transferred in a directly through both the bus portions 50, 52 16-bit word operation which is not compatible with the 8-bit data lines and therefore should not affect devices coupled to these lines. When a 16-bit data transfer occurs in addition to the command enable CMDEN disabling the 8-bit data bus transfer command lines, the control logic 11 also generates a signal HLEN (high to low enable) which disables buffer 31. Signal LSTB is also generated which disables data latch 39. Buffer 31 is a unidirectional device which provides buffering between input port 31A and output port 31B and will pass data from input port 31A to output port 31B, in the direction indicated by arrow 31C when an enable signal is received at the EN (enable) input. Latch 39 is a latch, such as a D-type flip-flop, which will transfer information from the D input to the Q output in the direction 39A when enabled at the terminal 39B and stores this information until cleared or it is fed new information.

Buffer 31 and latch 39 together form a data path over which data from the 16-bit microprocessor or the 8-bit peripheral is directed, depending upon whether a read or a write operation is to be performed.

During a write operation in which a 16-bit to 8-bit conversion is required, the two bytes available from the CPU via data busses 50 and 52 are available simultaneously. They are written in sequence onto 8-bit data bus 60 one byte at a time. The functions thus required are to enable or disable elements between the path of data busses 50 and 52 and data bus 60. Buffers are well suited for this function, and therefore elements 31 and 38 may be buffers.

During a read operation, two bytes from data bus 60 must be fetched sequentially. Thus, a memory function is required, and a latch can be selected as element 39. The signal address change signal (ADCHG) is applied to exclusive OR gate 32 where it is exclusively orred with the A0 address line signal received from the 16-bit data processor on line 34. The resulting signal from exclusive OR gate 32 provides the BA0 signal at terminal 36 which is coupled to the 8-bit external device. The signal ADCHG changes state (goes low) upon the presence of 8-bit data transfer which thus permits the data transfer of the A0 memory address signal unchagned to become the BA0 bus signal to the 8-bit compatible device.

The ADCHG signal is used to produce the MBDIS (mother board buffer disable) signal which is connected to the mother board to disable the bidirectional data buffer 38. Data is transferred through buffer 38 only during direct memory access (DMA) and 8-bit data transfers. Due to the disabling of latch 39 and buffer 31 and 38 there will be no transfer of data to the 8-bit bus 60 during a 16-bit data transfer.

The operation of the bus controller is considerably different during 8-bit data transfers. During 8-bit data transfers, 8-bit wide devices external to the microprocessor, such as input/output expansion boards communicate with the microprocessor 16-bit data bus 50 through the bus converter.

If an 8-bit transfer occurs, the 16BCH signal appearing on line 10 will not signal the presence of a 16-bit data transfer since it will not be generated by an 8-bit external device. Depending upon whether an active high or active low signal is needed, 16BCH will go low or high, respectively.

When one of the data commands AMRD, AMWR, AIOR, or AIOW is present, the CMD (data command) signal is generated, and as shown in the flowchart of FIG. 3, the device will advance to the step where the 16-bit microprocessor is stopped and set ready by signal ARDY (FIG. 1). The microprocessor will thus wait for the data transfer. At this time, the signal CYCLE which is generated by an AND gate 72 (FIG. 2) from the abovementioned CMD signals and the 16BCH signal will go high and begin the cycle of the timing and control logic 11.

Next, it is determined whether or not a word operation, that is, a double cycle or 2-byte operation is being requested of the microprocessor. This is determined depending upon the status of a signal BHE (byte high enable) received from the microprocessor and the address A0. The BHE is an active, low signal which indicates that the high byte operation should be followed when BHE goes low. Word operations occur on an even address and therefore A0 equals 0. Byte or word operation is determined by decoding the BHE and A0 signals to produce a byte/word result according to the following Table I.

TABLE I

| BHE | A0 | BYTE/WORD | |
|-----|----|-----------|---|
| 0 | 0 | 0 | Whole word (double cycle) |
| 0 | 1 | 1 | Higher Byte (single cycle) |
| 1 | 0 | 1 | Lower Byte (single cycle) |
| 1 | 1 | 1 | None |

Figure 2:
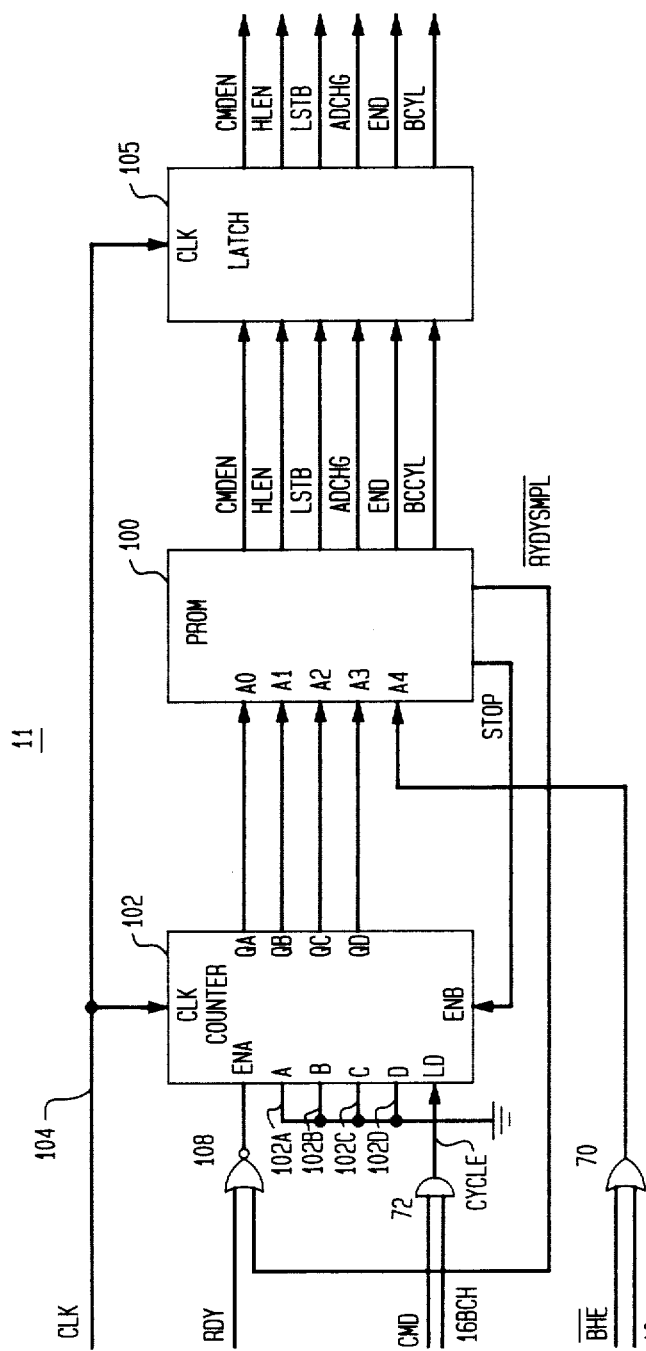
FIG. 2 is a diagram of the timing and control logic utilized in the bus converter according to the present invention.

This is performed by OR gate 70 of FIG. 2.

Word operation always occurs on an even address in a 16-bit microprocessor such as the 8086. Thus, if the high byte has been enabled and A0 equals 0 a whole word or double cycle operation is indicated. In FIG. 3 this is shown as a branching off to the righthand side of the program. If, however, either the high byte has not been enabled or the address A0 is equal to 1 (indicating an odd address) a single cycle or one byte operation is indicated. If the high byte is enabled, it is clear that a high byte operation is indicated. Similarly, if the high byte or the BHE has not been made true, a low byte operation must be intended.

Refer again to the flowchart of FIG. 3. If it is found that the operation is not a word operation, the lefthand side of the flowchart after the decision will be followed. As a first step, the appropriate data bus portions 50 or 52 will be enabled depending upon the status of BHE. As stated before, if BHE indicates a high byte, the data bus portion 50 corresponding to data bits D8–D15 is chosen. If, however, the BHE signal indicates that it is a lower byte operation, then the data bus 52 which carries data bits D0–D7 is selected. The signal HLEN is generated by logic 11 and enables buffer 31 if a write operation is to progress to permit data bus D8–D15 to go to the 8-bit device. HLEN is anded in AND gate 35 with the write command (WCMD) signal since information is to be passed in the direction of arrow 31C only if data is to be written into the memory or other external device coupled to 8-bit data bus 60. WCMD is generated by OR gate 36 which samples the AMWR and AIOW. If either one is high a write command is indicated.

When LSTB goes high, through the OR gate 37 generating the signal RMCD and the AND gate 58, it will enable latch 39 and hence data bus D0–D7 to pass through this buffer 38 when it is enabled. This will happen on a read operation i.e. when the microprocessor is to read data from the 8-bit peripheral. Thus, data on data bus 60 will pass through this latch to the microprocessor to become D8–D15 on a read operation.

When BHE is high, the data lines D0–D7 go directly to the mother board as the lower byte via buffer 38. The command enable signal (CMDEN) will be set high to permit signals coming from lines 20, 21, 22 and 23 to be enabled and thus the signals AMRD, AIOR, AMWR or AIOW are permitted to go through the AND gates 25 to 28 to activate any one of the signals BMRD, BIOR, BMWR or BIOW depending upon which operation is to be performed on the appropriate 8-bit external device.

In the next two steps, the bus converter will wait for a ready signal (RDY) from the peripheral or other device. This is a signal generated by the external device indicating that it is ready to receive any one of the previously mentioned four data commands. Wait for ready is accomplished by first sampling the RDY from the peripheral then checking to see whether or not the ready is activated or not. If it is not, the program returns to sample RDY again. If it is, however, in an active condition, the timing and control logic 11 will proceed further in the cycle, at the end of which the 16-bit microprocessor (e.g. the 8086) is released indicating that read data is available or write data has been written into the peripheral. This is performed through the ARDY line.

The bus converter then checks to see if CMD is true, that is, if any of the data commands are still active. If so, the bus converter remains in the same state so that the 8-bit data transfer can continue. If not, however, the bus conveter will return to the start and the sequence can begin again.

Referring again to FIG. 3, if a word operation has been selected according to the previously given table, two successive data bytes will be received from data bus 60 in a read operation. During a write operation the high (D15–D8) and low (D0–D7) portions of the 16-bit data bus will be successively sent to the peripheral.

First, the converter changes the data address to odd, since as stated above, in word operations the address is always even. This is done via the previously discussed ADCHG (address change) signal. The signal ADCHG will always be low for byte operations. This also provides the MBDIS signal which disables the 16-bit microprocessor data buffer 38 and data lines D0–D7 from the microprocessor. The ADCHG signal is also input to the exclusive OR gate 32 and on a word operation drives the signal BAO high.

As a next step, the high to low path is enabled. On a write operation when the signal HLEN is active buffer 31 is enabled. On a read operation when the signal LSTB is active latch 39 is enabled. The command enable signal CMDEN then enables AND gates 25 through 28 to permit the passage of the appropriate read, write, input/output read, or input/output write signals.

The bus converter next waits for the RDY signal from the peripheral. If the peripheral is ready, it will provide a strobe signal to permit the data transfer to take place by storing the data in latch 39, otherwise, it waits for the RDY signal. AND gates 25–28 are then disabled by CMDEN and therefore prevent the data commands from passing to the 8-bit boards.

To pass the low bytes the low to low path is enabled by setting the HLEN signal to disable buffer 31, and the LSTB signal to disable latch 39. This permits the D0–D7 signals appearing on bus 52 to pass on to the 8-bit data bus 60 and to the 8-bit external device, and also permits data transfer in the reverse direction.

The address, which had previously been changed to odd by the ADCHG signal, is now returned to even by resetting the ADCHG signal and the CMDEN signal is now set to enable AND gates 25 through 28. Once again, the bus converter will wait for the RDY signal from the peripheral; when it is ready the 16-bit microprocessor is released to send the data to the 8-bit peripheral.

Next, it is determined if the CMD signal is still active. If it is, the converter is held in the same configuration, to permit any further data transfer. If not, the process returns to the start position to re-begin.

Refer now to FIG. 2 in which timing and control logic 11 is shown in greater detail. The heart of the timing and control logic 11 is PROM 100 the program of which is addressed in the proper sequence by counter 102 and is rendered static by being provided to a latch 105. Counter 102 is driven by a clock signal received on line 104 which may be the same clock signal utilized by the 16-bit microprocessor. In the example of the 8086, the clock signal may be 8 megahertz.

Counter 102 has inputs 102A, B, C and D tied to ground. When a command signal CMD is received and a 16BCH signal is received the CYCLE signal is generated indicating that the cycle is to begin. The CYCLE signal is coupled to the load terminal of counter 102. When this signal is made active, counter 102 will load into its internal registers whatever number appears at its A, B, C and D inputs. Since they are tied to 0 or ground, zero is loaded to begin the count. The output of the counter in this case will be all zeros and is used to address the input to PROM 100. Address inuts QA, QB, QC and QD A0, A1, A2 and A3 of PROM 100 are coupled to the outputs of counter 102. Address input A4 is coupled to OR gate 70 and will be discussed in further detail hereinbelow. Whenever all zeros are applied to inputs A0, A1, A2 and A3 of PROM 100, regardless of the state of input A4, the PROM output will be as shown in Table II.

TABLE II

| PROM ADDRESS | | | | | PROM OUTPUT | | | | | | | |
|---|---|---|---|---|---|---|---|---|---|---|---|---|
| A4 | A3 | A2 | A1 | A0 | STOP | RDYSMPL | BCCYL | END | ADCHG | LSTB | HLEN | CMDEN |
| X | 0 | 0 | 0 | 0 | 1 | 1 | 1 | 1 | 0 | 0 | 1 | 1 |

This provides the signals necessary to perform a 16-bit data transfer and the signals that are output are utilized as previously described. The additional signals STOP and RDYSMPL are used to inhibit counter 102 selectively during 8-bit and 16-bit data transfers while signal END is utilized together with the CYCLE signal to produce a signal ARDY that indicates that a 16-bit data transfer can take place. The signal BCCYL indicates if the bus converter cycle is active or not and may be utilized by the microprocessor.

If an 8-bit transfer is to occur, however, the 16 BCH signal will not indicate that a 16-bit channel transfer is about to take place. If one of the data command signals is high it will then cause a CMD signal to be generated. The CYCLE signal will thus go through a transition which starts counter 102. Counter 102 starts counting at a rate of 8 megahertz until the counter is stopped. The counter stops when it receives the appropriate signal on its enable inputs ENA or ENB.

As the counter goes through its count, it will provide a new output at its output terminals with each count depending upon how the PROM has been programmed. Counter 102 is a 16-bit counter which will return to a count of 0 after it has reached a count of 15 (1111), as shown in the Double Cycle (word) portion of Table III below.

TABLE III

| PROM ADDRESS | | | | | PROM OUTPUT | | | | | | | |
|---|---|---|---|---|---|---|---|---|---|---|---|---|
| A4 | A3 | A2 | A1 | A0 | STOP | RDYSMPL | BCCYL | END | ADCMG | LSTB | HLEN | CMDEN |
| Double Cycle (Word) | | | | | | | | | | | | |
| 0 | 0 | 0 | 0 | 0 | 1 | 1 | 1 | 1 | 0 | 0 | 1 | 1 |
| 0 | 0 | 0 | 0 | 1 | 1 | 1 | 0 | 1 | 1 | 0 | 1 | 1 |
| 0 | 0 | 0 | 1 | 0 | 1 | 1 | 0 | 1 | 1 | 0 | 0 | 1 |
| 0 | 0 | 0 | 1 | 1 | 1 | 1 | 0 | 1 | 1 | 0 | 0 | 0 |
| 0 | 0 | 1 | 0 | 0 | 1 | 1 | 0 | 1 | 1 | 1 | 0 | 0 |
| 0 | 0 | 1 | 0 | 1 | 1 | 0 | 0 | 1 | 1 | 1 | 0 | 0 |
| 0 | 0 | 1 | 1 | 0 | 1 | 1 | 0 | 1 | 1 | 1 | 0 | 0 |
| 0 | 0 | 1 | 1 | 1 | 1 | 1 | 0 | 1 | 1 | 0 | 0 | 0 |
| 0 | 1 | 0 | 0 | 0 | 1 | 1 | 0 | 1 | 1 | 0 | 0 | 1 |
| 0 | 1 | 0 | 0 | 1 | 1 | 1 | 0 | 1 | 1 | 0 | 1 | 1 |
| 0 | 1 | 0 | 1 | 0 | 1 | 1 | 0 | 1 | 0 | 0 | 1 | 1 |
| 0 | 1 | 0 | 1 | 1 | 1 | 1 | 0 | 1 | 0 | 0 | 1 | 0 |

TABLE III-continued

| PROM ADDRESS | | | | | PROM OUTPUT | | | | | | | |
|---|---|---|---|---|---|---|---|---|---|---|---|---|
| A4 | A3 | A2 | A1 | A0 | $\overline{STOP}$ | $\overline{RDYSMPL}$ | $\overline{BCCYL}$ | $\overline{END}$ | ADCMG | LSTB | $\overline{HLEN}$ | $\overline{CMDEN}$ |
| 0 | 1 | 1 | 0 | 0 | 1 | 1 | 0 | 1 | 0 | 0 | 1 | 0 |
| 0 | 1 | 1 | 0 | 1 | 1 | 0 | 0 | 1 | 0 | 0 | 1 | 0 |
| 0 | 1 | 1 | 1 | 0 | 1 | 1 | 0 | 1 | 0 | 0 | 1 | 0 |
| 0 | 1 | 1 | 1 | 1 | 0 | 1 | 0 | 0 | 0 | 0 | 1 | 0 |
| Single Cycle (Byte) | | | | | | | | | | | | |
| 1 | 0 | 0 | 0 | 0 | 1 | 1 | 1 | 1 | 0 | 0 | 1 | 1 |
| 1 | 0 | 0 | 0 | 1 | 1 | 1 | 0 | 1 | 0 | 0 | 0 | 1 |
| 1 | 0 | 0 | 1 | 0 | 1 | 1 | 0 | 1 | 0 | 0 | 0 | 0 |
| 1 | 0 | 0 | 1 | 1 | 1 | 1 | 0 | 1 | 0 | 1 | 0 | 0 |
| 1 | 0 | 1 | 0 | 0 | 1 | 0 | 0 | 1 | 0 | 1 | 0 | 0 |
| 1 | 0 | 1 | 0 | 1 | 1 | 1 | 0 | 1 | 0 | 1 | 0 | 0 |
| 1 | 0 | 1 | 1 | 0 | 0 | 1 | 0 | 0 | 0 | 1 | 0 | 0 |

The A4 address input is derived by orring the BHE and the A0 signal in the NOR gate 108. The A4 input distinguishes between double cycle or word operations and single cycle or byte operations as shown in the Single Cycle (Byte) portion of Table III. The difference between the cycles is selected by input A4 of the PROM which is low for a word operation and high for a byte operation.

It will be noted that many of the outputs of the PROM in Tables II and III are given in terms of their inverse function. This merely reflects that in one specific embodiment, the particular hardware latches, buffers etc. utilizing these signals may also be provided when needed by simple inverters at the appropriate places.

The PROM output RDYSMPL is used together with the RDY signal to temporarily stop counter 102 as long as the signal RDY is low during the period in which $\overline{RDYSMPL}$ is 0. As soon as the RDY signal goes high (i.e. = 1), signalling that the device on the bus is ready, the counter will be enabled again. These signals are NORRED in NOR gate 108 the output of which is coupled to the ENA input of counter 102. Counter 102 will be disenabled when a 1 is applied to its ENA input. Of course it will be clear that in other embodiments of the invention, it is possible to employ a counter which is enabled on application of a high signal, in which case a NAND gate could be used in place of NOR gate 108 or other logical equivalents, such as an OR gate with inverted inputs.

The STOP signal as can be seen from Table II will be 1 until the end of either the double cycle or single cycle. The STOP signal is shown here as an active low signal and is coupled to the enable input ENB of counter 102. When it goes low, it disables counter 102 and causes it to stop any further generation of control logic signals.

I claim:

1. A bus converter device for compatibly interfacing a data processor having read and write operations and adapted for use with a data bus nm bytes wide with a first type of external device adapted for use with a data bus m bytes wide and a second type of external device adapted for use with a data bus nm bytes wide, said second type of external device generating a selection signal indicating that it requires a data bus nm bytes wide, said data processor including an instruction set having both m byte wide operations and nm byte wide operations, said device comprising:
nm bytes input data bus nm bytes wide coupled to said data processor for transmitting data between said data processor and said external devices, said input data bus being divided into low portions and high portions;
timing and control logic means for detecting whether a data processor operation is a nm or m byte wide operation, said timing and control logic means including means for effecting a first cycle of operation when a m byte wide operation is detected and a second cycle of operation longer than said first cycle when a nm byte wide operation is detected;
one m byte output data bus m bytes wide coupled to m byte wide external devices for transmitting data between said data processor and said m byte wide external devices;
data bus portion selecting means coupled between said nm byte input data bus and said m byte output data bus, and responsive to said timing and control logic means for selectively coupling one of said bus portions to said m byte output data bus during a write operation and for sequentially coupling said high data bus portion to said m byte output data bus, followed by said low bus portion during a read operation; and
means in said timing and control logic responsive to said selection signal and effective when said nm byte wide external devices are communicating with said data processor for disabling said timing and control logic means whereby said bus converter device is bypassed.

2. The device according to claim 1 wherein said bus portion selection means comprises first bidirectional buffer means coupled to said low bus portion for selectively coupling said low bus portion to said m byte data bus in response to a low to low signal received from said control logic, and further comprises second buffer means coupled to said high bus portion for selectively coupling said high bus portion to said m byte bus in response to a high to low signal received from said control logic.

3. The device according to claim 1 wherein said bus portion selecting means further comprises buffer means coupling said high bus portion to said m byte output data bus during a write operation, and latch means coupled to said m byte output data bus for receiving and storing data therefrom, and for passing data to said high bus portion when a read command is present.

4. The device according to claim 3 further comprising command lines for carrying read/write commands from said data processor and read/write command detecting means for detecting whether said data processor is requesting a read or write command and for generating signals indicative of a read command, a write command or a data command indicative of either a read or a write command.

5. The device according to claim 4 wherein said buffer means comprises a unidirectional buffer coupled between said high portion and said m byte output data bus, and further adapted to receive said write command for passing data from said high portion to said m byte output data bus when a write command is present.

6. The device according to claim 5 further comprising enabling means coupled between said data processor command lines, wherein said control logic receives said data command signal, said control logic generating a command enable signal for enabling said enabling means to pass said read/write commands to said external device, in response to a data command signal.

7. A bus converter device for compatibly interfacing a data processor having read and write operations and adapted for use with a data bus nm bytes wide with external devices adapted for use with a data bus m bytes wide and external devices adapted for use with a data bus nm bytes wide, said data processor including an instruction set having both m byte wide operations and nm byte wide operations, said device comprising:

nm bytes input data bus nm bytes wide coupled to said data processor for transmitting data between said data processor and said external devices, said input data bus being divided into low portions and high portions;

timing and control logic means for detecting whether a data processor operation is a nm or m byte wide operation, said timing and control logic means including means for effecting a first cycle when a m byte wide operation is detected and a second cycle longer than said first cycle when a nm byte wide operation is detected, said timing control logic means comprising:

a counter having output terminals for providing sequential memory addressed thereof; and read only memory (ROM) having address input terminals, wherein at least one address input is coupled to said counter output terminal, said ROM sequentially generating said enable signal, said low to low signal and said high to low signal responsive to said sequential memory address;

m byte output data bus m bytes wide coupled to m byte wide external devices for transmitting data between said data processor and said m byte wide external devices;

data bus portion selecting means coupled between said nm byte input data bus and said m byte output data bus, and responsive to said timing and control logic means for selectively coupling one of said bus portions to said m byte output data bus during a write operation and for sequentially coupling said high data bus portion to said m byte output data bus, followed by said low bus portion during a read operation; and means effective when said nm byte wide external devices are communicating with said data processor for disabling said timing and control logic means whereby said bus converter device is bypassed.

8. The device according to claim 7 wherein said processor generates a BHE signal indicative of whether a processor operation is a high or low byte operation, and generates address bus addresses having at least a lowest adress bit and further wherein said processor performs word operations on even addresses only, said timing and control logic further comprising logic means for logically operating on said BHE signal and said least significant address bit, and for generating an output signal representative thereof, wherein said output signal is coupled to the most significant bit in the input of said counter to cause said ROM address to distinguish between byte and word operations.

9. The device according to claim 1, wherein said timing and logic control means is adapted to cause one operation of said selecting means when effecting said first cycle, and to cause n operations of said selecting means when effecting said second cycle.

10. A device according to claim 9, wherein said storing means include a buffer for transferring the data from said high portion, and a latch for temporarily storing the data to be transferred from said m bit wide bus.

11. In an improved data interface device for selectively interfacing a nm byte wide processor data bus with at least one m byte wide external device bus and at least one nm byte wide external device bus, the processor being able to execute an instruction set having m byte wide operations and nm byte wide operations, said processor data bus being divided into n portions including a low portion and a high portion, said data interface device being of the type including first logic means for indicating whether a data processor operation is a nm or m byte wide operation, and data bus portion selecting means conditionable for selectively coupling the portions of said processor data bus to said m byte wide bus, said selecting means including storing means for temporarily storing at least the data to be transferred from said m byte wide bus to the high portion of said nm byte data bus and the data to be transferred from said high portion to said m byte wide bus, the improvement comprising:

second logic means for indicating whether the bus of the external device to be interfaced is a nm or m byte wide bus, addressable read only memory means for generating a set of signals to condition said selecting means according to the indications of said first and second logic means, counter means for providing sequential addresses to said read only memory, means responsive to the indication of said second logic means for causing the operation of said counter when a m byte wide bus is connected, and control means conditioned by the indication of said first logic means for causing said counter to count according to a first module when an instruction of a m byte operation is executed and according to a second module longer than said first module when an instruction of a nm byte operation is executed.

* * * * *